June 10, 1941.  B. LONG  2,244,715
TEMPERED GLASS AND PROCESS FOR MANUFACTURE OF THE SAME
Filed Dec. 17, 1935  3 Sheets-Sheet 1

Inventor
Bernard Long.
By Dinsley & Cole
Attorneys

June 10, 1941.  B. LONG  2,244,715

TEMPERED GLASS AND PROCESS FOR MANUFACTURE OF THE SAME

Filed Dec. 17, 1935  3 Sheets-Sheet 2

Inventor
Bernard Long
By Dresey & Cole
Attorneys

June 10, 1941. B. LONG 2,244,715
TEMPERED GLASS AND PROCESS FOR MANUFACTURE OF THE SAME
Filed Dec. 17, 1935 3 Sheets-Sheet 3

Inventor
Bernard Long,
By Dorsey & Cole
Attorneys

Patented June 10, 1941

2,244,715

UNITED STATES PATENT OFFICE 2,244,715

TEMPERED GLASS AND PROCESS FOR MANUFACTURE OF THE SAME

Bernard Long, Paris, France, assignor to The American Securit Company, Wilmington, Del., a company of Delaware Application December 17, 1935, Serial No. 54,918
In France December 22, 1934

13 Claims. (Cl. 49—89)

When tempered glass is used for windows, particularly in wind-shields of automobiles, it breaks under the influence of a shock into a large number of small harmless fragments, its transparency is altered at the time that the fragmentation is produced; when the fragments remain at their place within the wind-shield a new accommodation of the eye is necessary for the visibility again to become satisfactory. The duration of this accommodation, though very short, in the meanwhile may perhaps be sufficient, in the case of high speeds of the vehicle, to cause a disturbance in its driving, resulting in accidents.

The present invention remedies this objection. It has for its object a new industrial product, formed by a tempered sheet of glass or a tempered plate glass which presents, when it is broken, zones in which there are very numerous and small fragments and other zones in which the pieces have larger dimensions and polygonal or rounded forms, each of the second-mentioned zones being entirely surrounded or framed by the first-mentioned zones so that the size of the larger pieces produced in case of breakage of the sheet is at maximum of the size given to said second-mentioned zones; by virtue of the presence of the pieces of larger dimensions the visibility remains sufficient at the time of the break. By adopting sufficiently reduced dimensions for each of the said second-mentioned zones and giving to their periphery a proper shape the pieces coming from these zones in case of breakage are not dangerous while keeping sufficient visibility. The encompassing or encircling zones with fine fragmentation have for example a size of 10 to 15 mm., the encompassed zones, more or less rounded and formed by a single piece or by a small number of pieces, having a diameter of from 50 to 70 mm.

The invention concerns, furthermore, a process for the fabrication of this product which consists in subjecting the two types of zones to different thermal conditions in a manner to produce a stronger tempering in the encompassing or surrounding zones, which assures in the case of breakage a fine fragmentation thereof, the encompassed or surrounded zones being tempered less and not breaking or breaking up into larger pieces.

Finally, the invention comprehends modes of realizing the process which consists, for example, either to heat uniformly the sheet of glass over its entire surface and then to cool it more strongly in the encompassing or encircling zones, or to heat it more strongly in the encircling zones, and then to cool it suddenly and in a uniform manner over its entire surface, or to effect a variation of the intensity of the heating and cooling in the same sense in such a manner that these intensities are stronger in the encircling zones, or to reheat the sheet in the encircled zones after it has undergone a tempering by a general heat followed by a uniform cooling, in a manner to diminish the degree of tempering of these zones.

In the annexed drawings.

Figure 3:
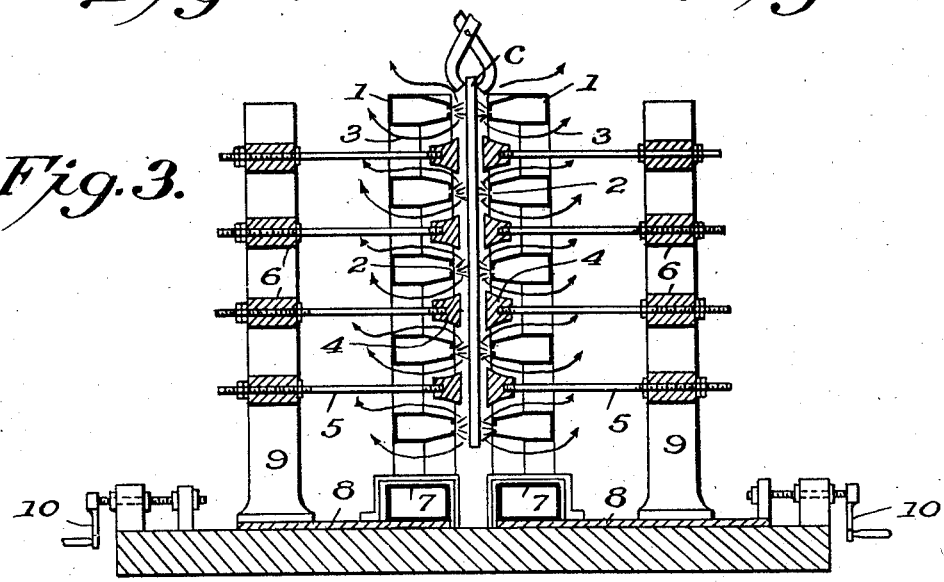
Fig. 3 is a vertical section of an arrangement for cooling by blowing localized upon the encompassing zones.
Figure 4:
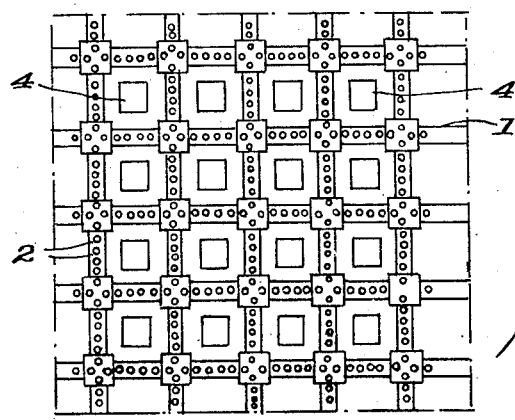
Fig. 4 is a front view of this arrangement.
Figure 5:
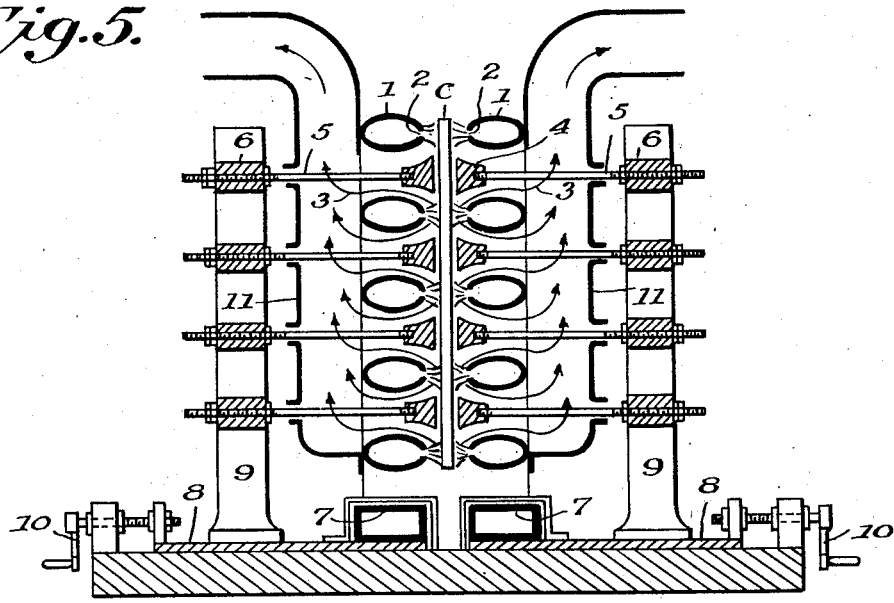
Figure 6:
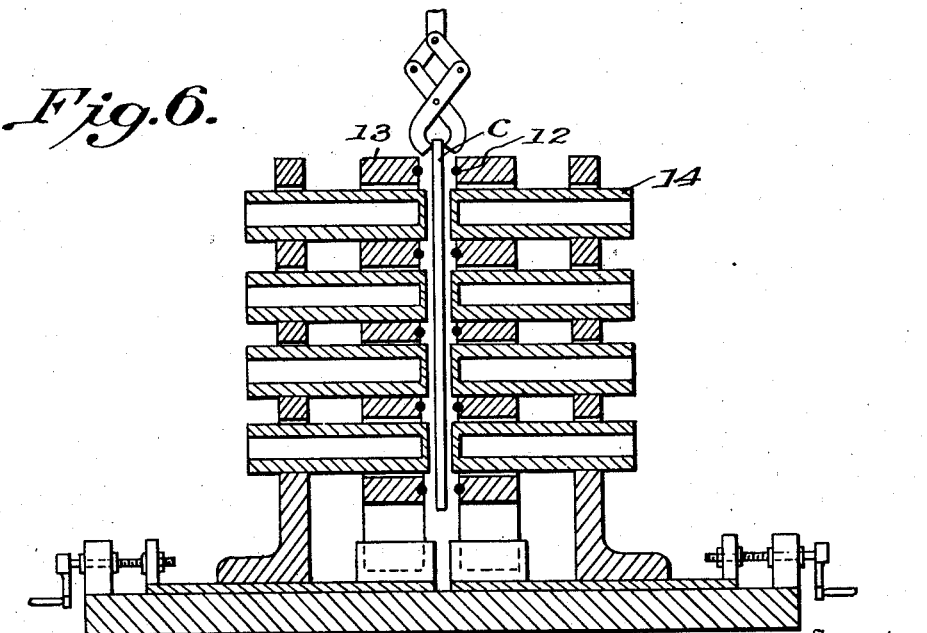
Figure 7:
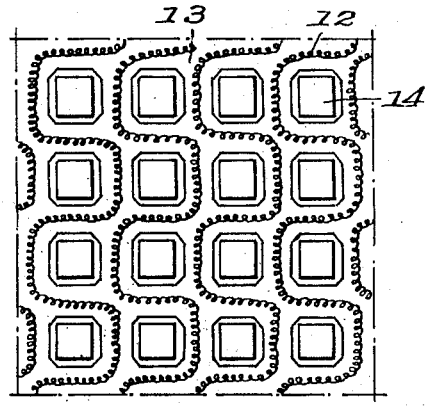
Figure 8:
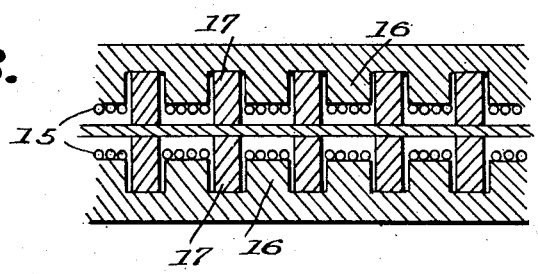
Figure 9:
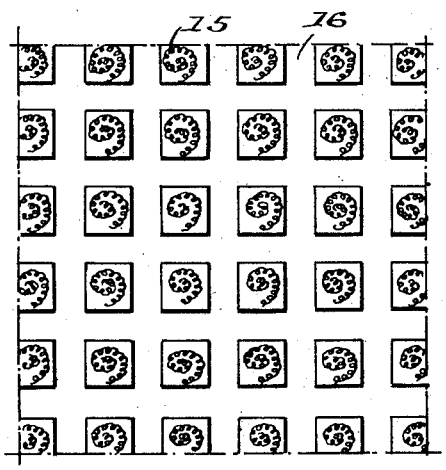
Figure 10:
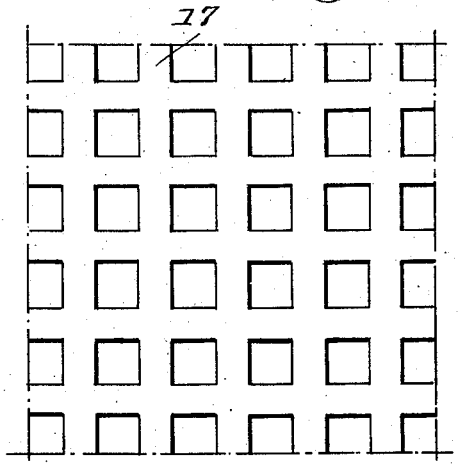

Fig. 5 relates to a variation of the arrangement of Figs. 3 and 4;

Fig. 6 is a vertical section of a heating arrangement localized upon the encompassing zones;

Fig. 7 is a front view of a portion of the arrangement of Fig. 6;

Fig. 8 is a sectional view of an arrangement for the re-heating of the encompassed zones after the tempering of the sheet of glass;

Figs. 9 and 10 are front views of this arrangement.

Figure 1:
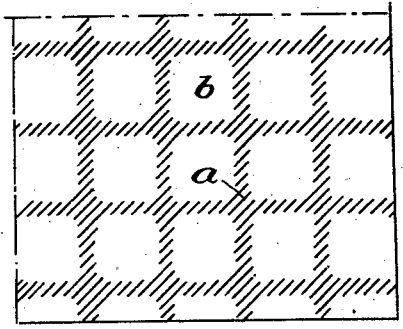
Figs. 1 and 2 represent, as examples, two views of the fragmentation of glass tempered in accordance with the invention.
Figure 2:
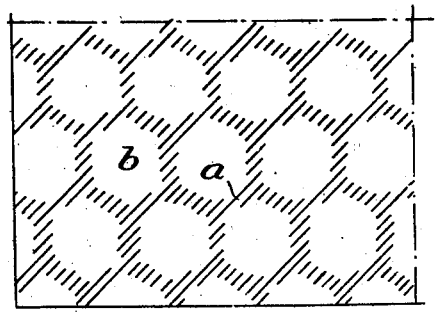

In Figures 1 and 2, the encompassing or surrounding zones $a$ of fine fragmentation are indicated by hatching, while the encompassed or surrounded zones $b$ where the fragmentation is nil, or greatly reduced, are not hatched.

The first manner of realizing the process represented in Figures 3 and 4 consists, in after having heated the sheet of glass $c$ in a uniform manner by known means, cooling it more strongly in the encircling zones.

For this purpose, the tempering apparatus comprises two networks of blowing tubes 1 disposed on the opposite sides of the sheet and pierced by holes 2 through which a cooling fluid 3 is projected upon the zones of fine fragmentation which are to be produced in the sheet. The blowing holes have a small diameter, for example 2 to 3 mm. and are very close to each other. The distance between the outlet of the jets and the surface of the glass must be slight, without nevertheless being such that the jets produce impressions in the glass; 2 to 3 cm. have been found sufficient in practice.

In order to shield the portions of the glass of the surrounded zones from a too sudden cooling, the screens 4 are disposed in each of the spaces between the meshes of the blowing network. The distance from these screens to the sheet of glass is adjustable, independently of the distance from the blowing holes to the sheet, by means of the rods 5 which support the screens and which slide in the guides 6. By this adjustment either all contact of blowing air with the surrounded zones may be excluded in an absolute manner or a portion thereof may be permitted to act in said zones, in the form of eddies. Thus the degree of tempering desired to be imparted to the surrounded zones can be adjusted exactly. The two networks of tubes 1 rest through the intermediary of the inlet casings 7 upon the movable plates 8 upon which are fixed likewise the frames 9 carrying the screens 4. By means of the cranks 10, the whole assembly of tubes and screens can be shifted aside simultaneously in order to introduce the sheet of glass and thereafter brought close to the glass for the exact distance which is suitable for the blowing.

The air which has struck the sheet deviates therefrom in escaping freely into the atmosphere; in order that this flow may be executed easily, which is a condition in order that the attained results are not different between the edges of the sheet and its center, a small section is imparted to the rods 5 and the frames 9 are removed sufficiently from the blowing grilles by giving, for this purpose, a sufficient length to the rods 5.

The distance from the screens 4 to the sheet also may be modified individually so that their action can be rendered different, for example between the edges and the center of this sheet.

In the variation of this device represented by Fig. 5, in which the same numerals designate the same elements as in Figs. 3 and 4, the air which has served for cooling the sheet c does not escape freely but is sucked in by a casing 11, in which a suitable under-pressure is attained by means of a ventilator or by any other means.

A second mode of realizing the process consists in heating the sheet more strongly in the encompassing or surrounding zones, then cooling it suddenly by means of known apparatus with a uniform cooling.

For this purpose, the heating arrangement comprises (Figs. 6, 7) two networks of heating resistances, disposed upon the opposite sides of the sheet of glass c and formed by conductors 12 fixed in refractory frames or braces 13, which, viewed normally to the plate glass, affect the form of the paths of fine fragmentation or encompassing zones which are contemplated to be occasioned in the sheet. The conductors 12 are placed a slight distance from the sheet, which localize the heat in the zones of the glass which are situated in front of the frames 13 of the networks. In the meshes thereof are disposed the screens 14, by virtue of which the encompassed zones are shielded from the radiation of conductors 12. These screens are hollow and may be traversed by a cooling fluid. Their distances to the sheet of glass, moreover, can be adjusted independently of the heating frame 13, and independently of each other.

Figs. 8, 9 and 10 relate to a third mode of realizing the process in which the sheet of glass after having been tempered by a heating and a sudden uniform cooling, is reheated anew in the encompassed zones. These figures represent the reheating arrangement.

The heating elements 15 are mounted upon two plates 16 of refractory material disposed upon the opposite sides of the sheet c at the locations corresponding to the encompassed or surrounded zones which are contemplated to be occasioned therein. Between the different heating regions 15 of each plate are interconnected the bars of a grille 17 represented in part in Fig. 10 of which the outline corresponds to the encompassing or surrounding zones. These bars may be hollow and traversed by a cooling fluid. The sheet of glass is placed in contact with the grilles, which protect it in the encompassing or surrounding zones against the action of the heating elements 15.

In order that a sheet of glass fall within the limits of the invention, it is not necessary that it presents upon its whole surface the type of break which has served to characterize the invention, but it is sufficient that it presents this mode of fragmentation upon a part of its surface. So it is, that in a wind-shield, the invention can be limited to the portion of glass which finds itself in front of the driver's eyes. The different processes of fabrication will be regulated, in consequence, in a manner that the state of the indicated tempering is caused only in the corresponding parts of the sheet.

It is apparent likewise that the different processes which have been described can be combined, for example, by adding heat more strongly upon the encompassing zones to the stronger cooling upon these same zones, or to combine one of these two means with reheating effected after tempering upon the encompassed zones.

The apparatus herein shown is claimed in my application Serial No. 262,578, filed March 17, 1939, as a division hereof.

Having thus described my invention what I claim as new and desire to secure by U. S. Letters Patent is:

1. A new article of manufacture comprising a sheet of glass having at least a portion thereof tempered in order to produce zones of different degrees of tempering, each of the less tempered zones being entirely surrounded by a higher tempered zone.

2. As a new article of manufacture a tempered sheet of glass comprising zones giving by breakage numerous small fragments which surround entirely zones where the fragments in case of breakage are of larger dimensions.

3. As a new article of manufacture a tempered sheet of glass which, when broken, produce fragments of comparatively large size, each fragment being entirely surrounded by numerous fragments of very small dimensions.

4. As a new article of manufacture a sheet of glass having tempered zones surrounded by other zones which are tempered to a higher degree than the first-mentioned zones whereby, if the sheet is broken, the surrounding zones give numerous small fragments and the surrounded zones give pieces having larger dimensions.

5. As a new article of manufacture a sheet of glass having tempered zones and surrounding zones tempered to a higher degree than said first-mentioned zones whereby the sheet presents, when broken, zones corresponding to the higher tempered zones wherein numerous and small fragments surround zones corresponding to said first-mentioned zones in which the pieces have much larger dimensions than said fragments and polygonal and rounded forms, so that by virtue of the presence of these pieces of large dimensions, the visibility of the sheet after receiving the shock is not diminished unduly.

6. As a new article of manufacture a sheet of glass having tempered zones surrounded by other zones which are tempered to a higher degree than the first-mentioned zones whereby, if the sheet is broken, the surrounding zones give numerous small fragments and the surrounded zones give pieces having larger dimensions, the dimensions of the surrounded zones being such that the pieces coming from said zones cannot be dangerous if they are projected.

7. A method of manufacturing a sheet of glass having at least a portion thereof tempered in order to produce zones surrounding other zones wherein the first mentioned zones are tempered to a higher degree than said other zones which comprises subjecting the two types of zones to different thermal conditions to produce a high temper in the first named zones.

8. A method of manufacturing a sheet of glass having in at least a portion thereof tempered zones surrounding zones which are tempered to a lesser degree than said first mentioned zones which comprises subjecting the two types of zones to different thermal treatments to produce a high temper in the first named zones.

9. A method of manufacturing a sheet of glass having in at least a portion thereof tempered zones surrounding zones which are tempered to a lesser degree than said first mentioned zones which comprises heating said portion of the sheet uniformly over its whole surface and cooling said portion more strongly at said first mentioned zones.

10. A method of manufacturing sheet glass having in at least a portion thereof tempered zones surrounding zones which are tempered to a lesser degree than said first mentioned zones which comprises heating said portion of the sheet more intensely at said first mentioned zones and cooling the sheet suddenly and uniformly over its whole surface.

11. A method of manufacturing a sheet of glass having in at least a portion thereof tempered zones surrounding zones which are tempered to a lesser degree than said first mentioned zones which comprises heating said portion of the sheet and at least cooling said portion more intensely at said first mentioned zones.

12. A method of manufacturing a sheet of glass having in at least a portion thereof tempered zones surrounding zones which are tempered to a lesser degree than said first mentioned zones which comprises heating more intensely and cooling more intensely said portion of the sheet at said first mentioned zones.

13. A sheet of glazing glass having therein areas of substantial size devoid of acute corners and free of high temper and separated from each other by areas of high temper.

BERNARD LONG.